Figure 1:
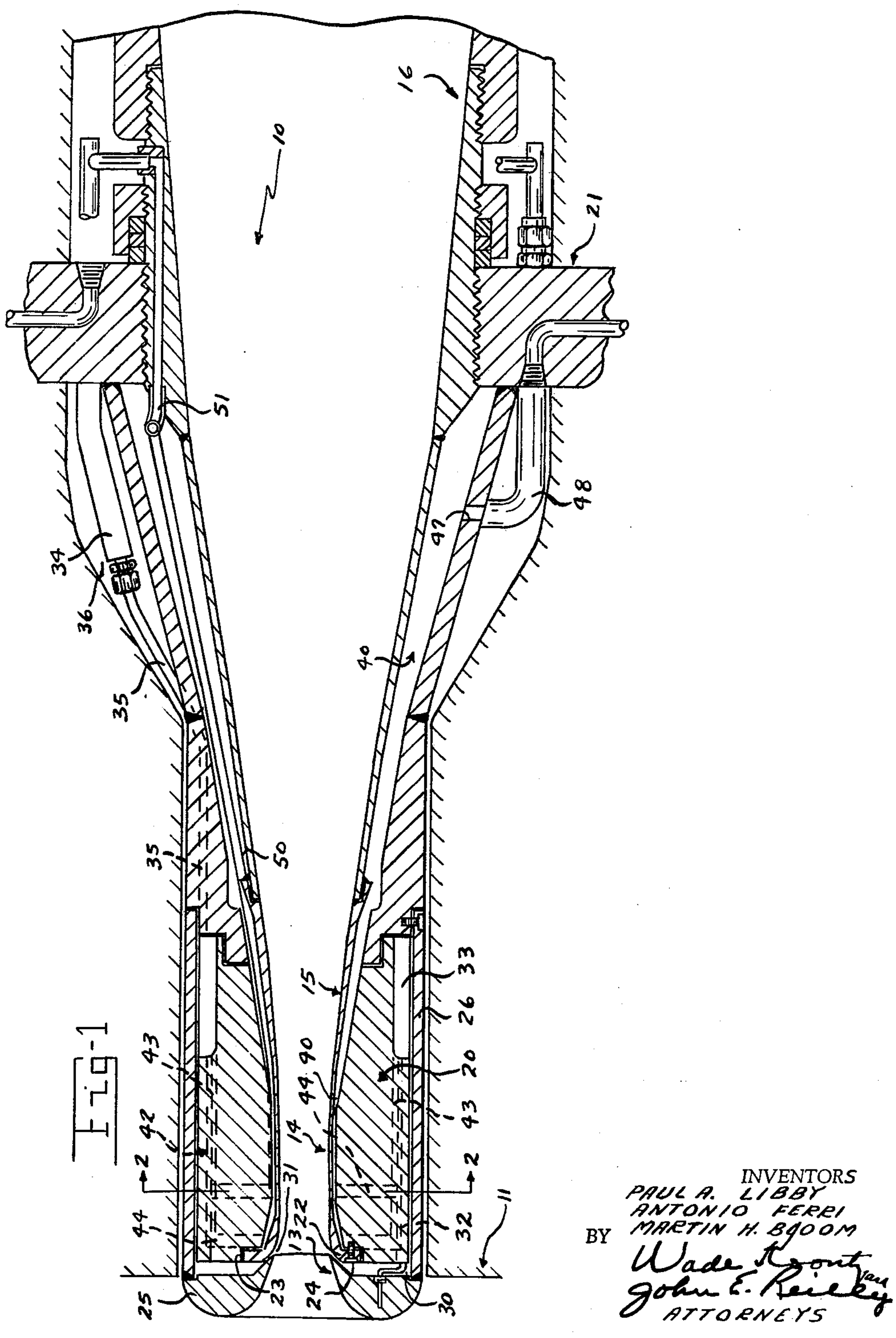

Oct. 24, 1961 P. A. LIBBY ET AL 3,005,338

NOZZLE COOLING APPARATUS AND METHOD

Filed Sept. 23, 1957 2 Sheets-Sheet 1

INVENTORS
PAUL A. LIBBY
ANTONIO FERRI
MARTIN H. BLOOM

BY Wade Koontz
John E. Reilly
ATTORNEYS

Oct. 24, 1961 P. A. LIBBY ET AL 3,005,338

NOZZLE COOLING APPARATUS AND METHOD

Filed Sept. 23, 1957 2 Sheets-Sheet 2

INVENTORS
PAUL A. LIBBY
ANTONIO FERRI
MARTIN H. BLOOM

BY Wade Koontz and
John F. Reilly
ATTORNEYS

United States Patent Office 3,005,338
Patented Oct. 24, 1961

3,005,338
NOZZLE COOLING APPARATUS AND METHOD

Paul A. Libby, Freeport, Antonio Ferri, Rockville Centre, and Martin H. Bloom, Woodmere, N.Y., assignors to the United States of America as represented by the Secretary of the Air Force Filed Sept. 23, 1957, Ser. No. 685,763
10 Claims. (Cl. 73—147)

The present invention relates to the cooling of surfaces exposed to high energy gas streams.

The present invention has more particular relation to an apparatus and method for cooling nozzle-shaped flow conduits exposed to high energy gas streams, involving either a high velocity flow with low temperatures or high temperatures with a low velocity flow, or a combination of a high temperature with a high velocity flow, and further wherein the gas streams are normally flowing at a high pressure level. For example, such conditions are present in missile re-entry systems, rocket motors and hypersonic wind tunnel nozzles and other propulsve type devices.

As an illustration of the application of the present invention to the cooling of wall surfaces, hypersonic wind tunnel testing requires the acceleration of an air stream by means of some nozzle-shaped conduit to Mach numbers in excess of 5, and under conditions which will simulate atmospheric conditions at the given speed and at a given altitude. To establish these conditions, the air must be delivered to the nozzle at elevated temperature and pressure levels, such as on the order of 3,000° R., 600 p.s.i. and higher. Consequently, the nozzle wall surface is subjected to extreme heat transfer rates, particularly along the restricted area at the throat section of the nozzle.

Accordingly, it is proposed to cool the wall surface of the nozzle normally exposed to the high energy air stream in a unique manner by forming an insulated, low energy cooling stream between the wall and main stream flow. To provide a uniform layer of cooling flow, particularly in the throat section, some means must be provided to inject a suitably chosen gas just ahead of the throat section which will flow at a lower temperature level than the high energy stream yet will not mix with the high energy stream, but will provide a uniform layer protecting the wall surface from the extreme heat of the high energy stream.

Intermixture between two gas streams flowing adjacent one another can be best prevented by flowing the gases in a common parallel direction at equal velocities and with low turbulence at the interface between the streams. The use of air as the cooling stream would be feasible from the standpoint of low intermixture, equal velocity flow and ability to flow without affecting the physical characteristics of the main air stream; however, with the cooling air stream and main air stream flowing at essentially equal velocities and equal pressures, the stagnation temperatures of both streams will, of course, be approximately equal so that little cooling will result.

From a consideration of the properties of air and other gases, each possesses a different stagnation temperature for a corresponding sonic velocity. Similarly, the greater the sonic velocity of the gas the lower the stagnation temperature for a given Mach number. For instance, with air and helium flowing at the same Mach numbers the stagnation temperature of helium has been found to be about one-eighth the stagnation temperature of air. Of course, in the propulsive type devices mentioned, air is normally present as the main high temperature stream, and it is therefore more advisable in accordance with the present invention to utilize as the cooling stream a gas having a sonic velocity greater than air, or greater than the high energy stream.

It is further proposed to provide some means to accurately control the height and uniformity of the selected coolant gas stream introduced along the wall surface so that the wall temperature throughout at least that portion of the nozzle which is being subjected to the high temperature stream is governed by the coolant gas, and intermixture between the coolant and main stream is reduced to a minimum. The above is accomplished in the present invention by the regulation of the stagnation pressure of the gas coolant, by the reduction in turbulence in the coolant gas prior to injection into the nozzle and by controlling the size and contour of the injection passage into the nozzle.

Accordingly, by accurate control and selection of the gas coolant it is possible to maintain a predetermined, steady state temperature along the wall surface of a nozzle or similar conduit which is normally exposed to high energy streams. A further advantage of the present invention lies in its conformability to various cooling problems with very little modification necessary in the construction of the surfaces to be cooled, and also in the ability to apply the principle of the present invention to other types of cooling methods and apparatus. For example, the present invention is adaptable for use with the liquid spray cooling method and apparatus as set forth in our copending application, Serial Number 654,049, filed April 19, 1957, Patent No. 2,892,308, whereby the principles of both may be combined to produce a practical means of cooling for extremely high heat transfer problems. This is accomplished basically by the injection of the gas coolant both along the inner and outer surfaces of the device to be cooled at a Mach number equivalent to the Mach number of the main high energy stream and by the injection of a liquid spray into the outer coolant stream. In this manner, it is possible to maintain a steady state controllable temperature along the inner surface and to equalize the pressure against the inner surface of the nozzle by the flow of a coolant stream along the outer surface thereof. Of course, the use of the liquid spray would be necessary only where the coolant streams would be flowing at such high Mach numbers that the stagnation temperature of the coolant stream would have to be reduced to the desired temperature level. Also the liquid spray could be utilized where air, in place of higher sonic velocity gases, is to be used as the coolant stream.

Accordingly, it is an object of the present invention to provide for cooling of a flow conduit subjected to high temperatures and pressures by the direction of a gas along the flow conduit in such a way as to form a smoothly flowing insulative cooling layer adjacent the conduit wall surface.

It is another object to provide for the cooling of a nozzle shaped flow conduit subjected to high energy streams which are being accelerated through the nozzle up to hypersonic speeds by the direction of a coolant gas, having a sonic velocity greater than the main high energy stream, along a surface of the conduit wall and in such a way as to form a smooth interface between the high energy and coolant stream so as to control the temperature level of the wall by the temperature level of the coolant stream.

It is a further object to provide for the introduction of a quantity of helium gas along the inner surface of a nozzle which is exposed to high temperature high velocity air streams; to provide for accurate control and regulation of the helium stream so as to prevent intermixture between the low energy helium stream and high energy air stream; and to provide for accurate contouring and proportioning of the injection passage for delivery of the helium stream into the nozzle in a manner to establish a smooth coolant gas layer along the inner surface of the nozzle wall wherein the coolant gas layer corresponds to the velocity and stagnation pressure of the main stream flow.

It is still a further object to provide for the combined insulation, cooling and pressure equalization of a thin-walled surface exposed to high energy streams by the introduction of low energy streams along the inner and outer surfaces of the wall in such a way as to establish a predetermined temperature and pressure reduction across the wall which will not be influenced by the main high energy stream, and to additionally provide for a liquid spray means in combination with the outer cooling stream to establish reduction in the temperature thereof.

Figure 3:
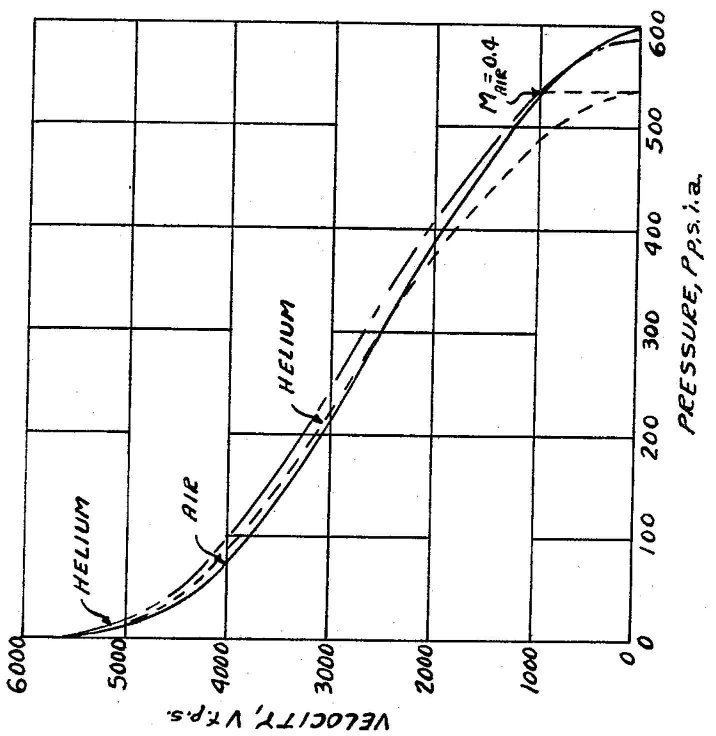
Figure 2:
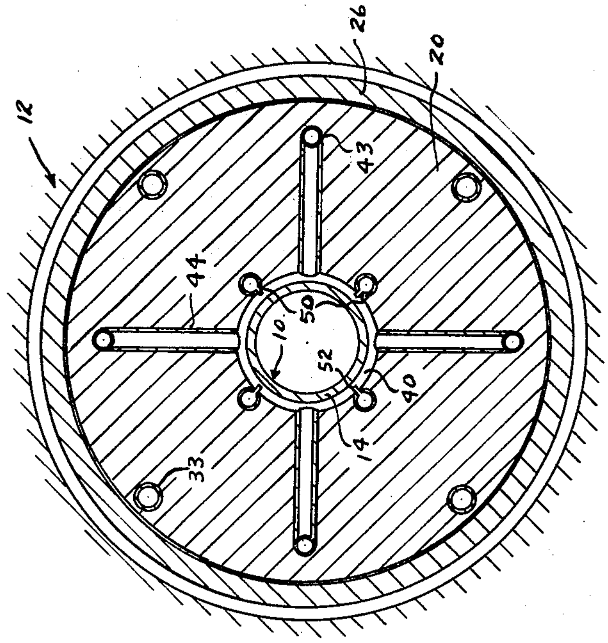

Other objects and features of the present invention will become more apparent from the following description considered in connection with the accompanying drawings; in which FIG. 1 is a sectional view of a hypersonic flow nozzle disposed in a wind tunnel housing to receive a high temperature, high pressure air stream from an air supply source;

FIG. 2 is a cross sectional view of the throat section taken on lines 2—2 of FIG. 1; and FIG. 3 is a graph illustrating the variation of velocity and pressure in a main air stream and a helium stream being accelerated through the hypersonic nozzle, in accordance with the present invention.

With more particular reference to the drawings there is shown in FIGS. 1 and 2 a preferred embodiment of the present invention illustrating a typical application of the present invention to a cooling problem; namely, that of cooling the wall of an axially symmetrical, hypersonic nozzle 10 inclosed in a wind tunnel housing 11 for the acceleration of a high temperature, high pressure air stream through the nozzle, and wherein the air stream is delivered to the nozzle from a forced air supply system including a heater (not shown) disposed at right angles to the entrance of the nozzle. The nozzle 10 as shown consists of a subsonic entrance section 13 into which the high energy stream from the air supply system is delivered, a throat section 14 for acceleration of the air stream through the subsonic speed range to sonic and supersonic speeds, followed by a divergent test or outlet section 15 for further acceleration of the air stream into the hypersonic speed range, together with an exhaust or diffusor section 16 disposed at the outer end of the test section 15.

The nozzle 10 is relatively thin-walled, particularly throughout the region along the throat section and test section adjacent the throat, so that it is easy to maintain a constant wall temperature across the thickness of the throat where the heat transfer rates are extremely critical. Also, the inner wall surface of the nozzle is made extremely rigid and smooth to prevent the development of shock waves and turbulence in the gas flow therethrough. The nozzle wall is accordingly composed of a suitable, high temperature material such as stainless steel or low carbon steel with a smooth, uniform nickel plating covering the inner surface thereof.

In performing test operations in the wind tunnel, the test model, not shown, is positioned in the nozzle adjacent the diffuser section 16. A high energy stream of high energy stream of air is prepared in the air supply system with the pressure and temperature of the air being governed by the desired Mach number in the test section; for example, a stagnation temperature of 3,000° R. and a stagnation pressure of 600 p.s.i. can be prepared for flow through the nozzle for acceleration up to a Mach number of 6 where the nozzle is one foot in diameter at the test section. For the required acceleration, the subsonic entrance converges into a throat section diameter of 1.5 inches and with a wall thickness of 0.120 inch.

To provide for adequate cooling of the high energy stream the cooling apparatus in FIGS. 1 and 2 illustrates the application of the insulative cooling apparatus and method in combination with the liquid spray cooling apparatus and method of our copending application. Where it is necessary only to provide an insulative cooling layer along the inner surface of the nozzle wall to achieve adequate cooling, the insulative cooling apparatus and method can, of course, be used apart from the spray cooling apparatus. For insulative cooling alone, a cooling jacket 20 is spaced between the nozzle 10 and the wind tunnel housing 11 by interconnection of the nozzle 10, wind tunnel 11 and cooling jacket 20 to an annular thick walled shoulder portion 21 which encloses the exhaust end 16 of the nozzle 10 and serves as a support structure for the entire assembly. Also, the nozzle 10 and jacket 20 are interconnected just ahead of the throat section 14 by connection of an outwardly extending annular shoulder 22 of the nozzle to an undercut portion 23 at the inner forward end of the jacket 20, the flange being held in place to the jacket 20 by means of suitable screw members 24, as shown.

Forming the subsonic entrance section 13 of the nozzle and the forward end of the cooling jacket 20 is a rounded circular ring or visor 25 which is disposed in spaced relation to the nozzle and jacket by attachment of the outer rim of the visor to an outer circular plate 26 which in turn is secured to the outer surface of the cooling jacket 20 and extends beyond the main body portion of the cooling jacket 20 at the forward end. For the supply of coolant gas along the inner surface of the nozzle wall, the visor 25 together with the shoulder 22 are further contoured and connected in spaced relation so as to form an annular settling chamber 30 which tapers inwardly into an injection passage or slot 31 communicating with the flow area of the nozzle.

Leading into the settling chamber 30 are a plurality of circumferentially spaced conduits 32 extending lengthwise through the outer surface of the main body portion of the cooling jacket 20 from the settling chamber 30 rearwardly into a central supply chamber 33 which is passed continuously around the cooling jacket 20. Coolant gas is delivered into the central supply chamber 33 from a suitable pressurized supply source 34 located at the exhaust end of the cooling jacket by means of supply conduits 35. The supply conduits 35 are passed rearwardly from their point of connection to the central supply chamber 33 through the body of the cooling jacket 20 then outwardly along a recess portion 36, disposed between the inner wall of the wind tunnel housing 11 and the cooling jacket 20, for connection to the supply source 34.

As above described, there are thus formed a series of passages or conduits for the delivery of a pressurized supply of gas through the injection passages 31 for flow along the inner wall surface of the nozzle. It will be noted that the injection passage 31 is slanted rearwardly and converges inwardly from the settling chamber 30 so as to direct the gas tangentially along the inner wall surface of the nozzle; of course the high energy stream will exert some influence adjacent the exit end of the slot 31 to force the coolant gas to assume a smooth layer along the inner wall surface of the nozzle, although the slot itself is primarily responsible for delivery of the gas in the desired direction. In addition, it is to be noted that the walls of the slot are gradually tapered so that little turbulence is introduced into the coolant gas stream as it leaves the slotted portion. In this respect, any turbulence introduced into the coolant gas stream as it is passed through the central supply chamber 33 and conduits 32 and 35 is substantially reduced by means of the settling chamber 30 in order that the coolant gas will assume a smooth flow through the slot portion.

In the nozzle configuration shown the slot portion is located at about the 0.4 Mach number section of the nozzle so that the coolant gas will be introduced at a point up stream from the throat and before the main high energy stream has accelerated to high velocity flow. If desired, of course, the gas may be introduced at other sections along the subsonic portion or around the forward surface of the visor 25; however, it has been found advantageous to introduce the coolant gas at a location just ahead of the throat section 14 so that the coolant gas layer may be controlled just prior to flow along the critical heat transfer region in the throat section of the nozzle.

If the temperature of the wall is to be governed by the coolant stream, a smooth uniform layer must be established throughout the critical heat region and little mixing must be allowed to take place between the coolant and main stream. To prevent mixing between the coolant gas stream and the main high energy stream it is therefore necessary to establish a smooth interface between the streams. This may be brought about primarily by introducing the coolant gas in a common parallel direction with the main stream and under conditions which will cause the coolant gas to match the velocity and pressure of the high energy stream. However, notwithstanding the development of equivalent flow conditions in the streams, the coolant gas stream will form a turbulent boundary layer adjacent the wall surface due to the contact between the high velocity flow and the solid surface. The coolant gas layer must therefore be of sufficient height to contain the turbulent boundary layer which will develop between the solid surface of the nozzle and the cooling stream. This turbulent boundary layer characteristic will of course be governed by the type of gas, the slot height and velocity, together with the stagnation temperature and pressure conditions in the main stream and coolant stream. From this, the mass flow of the coolant gas can be regulated by regulation of the slot height so as to establish a sufficient layer or thickness along the nozzle wall surface. For instance, a suitable slot height for use with the nozzle of the preferred embodiment is 0.13 inch which was sufficient to establish the necessary mass flow of coolant gas along the nozzle wall surface.

In the selection of a suitable coolant gas the prime consideration is that the gas selected have a sonic velocity greater than the high energy gas flow through the nozzle. As previously mentioned, in this way it is possible to provide for a coolant gas stream flowing at the same velocity and pressure as the main stream, yet at substantially lower temperatures so that the nozzle coolant temperature can be regulated in accordance with the selection of gas. It is further desirable that the gas will maintain velocity and pressure levels corresponding to the velocity and pressure levels in the main high energy stream as both gas streams are accelerated throughout the nozzle, since in this way mixing will be reduced to a minimum. In the preferred embodiment, with the use of a high energy air stream, helium gas has been found suitable for use as the coolant stream in that it has a high sonic velocity, is chemically inert and will closely follow the variation in velocity and pressure of the main air stream as it is accelerated through the nozzle, as shown in FIG. 3. It is also noted in FIG. 3 that, with the injection of helium gas through a slot in the Mach number 0.4 location it is only necessary that the helium gas be introduced at a stagnation pressure corresponding to the main stream as the coolant gas flow velocity will quickly approach the main stream velocity once it has entered the nozzle. This represents an additional advantage in the present invention in that the desired velocity and pressure level can be controlled in the coolant gas stream by regulation of the pressure alone and it is therefore not essential that the gas be forced through the delivery passages at high velocities which would tend to increase the turbulence of the gas prior to delivery through the slots. Furthermore, it is to be noted that fine control of the coolant gas is not critical in order to obtain the desired stream conditions.

With increased cooling requirements, especially where it is desirable to maintain a nozzle wall temperature below that which can be maintained by the coolant gas stream, or where pressure conditions impose an undue stress on the nozzle wall, the insulated cooling apparatus can be easily adapted for use in combination with the liquid spray cooling method as shown in FIGS. 1 and 2. Utilizing the cooling apparatus construction as set forth above, the liquid spray cooling apparatus, as more particularly described in our copending application, is easily adapted for use with the insulative cooling apparatus principally by controlling the spacing between the outer surface of the nozzle wall and inner surface of the cooling jacket 20. The inner surface of the cooling jacket 20 is accordingly spaced and proportioned throughout its length to form a contoured, annular cooling passage 40 throughout the critical heat region along the throat 14 and a portion of the divergent test section 15. The cooling passage 40 is contoured in such a way that the height of the passage varies proportionately with the diameter of the main flow contour of the nozzle at corresponding points along the passage and nozzle, respectively. The effective height and area of the cooling passage 40 thus correspond with the effective diameter and area of the nozzle 10 to attain equivalent flow characteristics for gases flowing therethrough.

To reduce the stresses imposed on the nozzle wall due to the high pressure in the main stream and coolant stream, the pressure may be equalized on opposed sides of the nozzle wall by delivery of a portion of the coolant gas from the central supply chamber 32 into the contoured passage 40 at a pressure equivalent to the pressure of the coolant stream. For this purpose delivery lines 42 are extended from the supply chamber 33 to the cooling passage 40 which consist of a plurality of supply pipes 43 extending along the length of the cooling jacket from the exit end of the supply chamber 32 for communication with transverse supply pipes 44. The supply pipes 43 are circumferentially spaced between the conduits 32 leading into the settling chamber 30 and the transverse supply pipes 44 are passed radially inwardly through the cooling jacket from their point of connection to the pipes 43. Two rows of transverse supply pipes 44 are provided, the forward row communicating with the cooling passage 40 opposite the subsonic section 13 of the nozzle and with the second row of pipes 44 passing into the cooling passage adjacent the intermediate portion of the throat section 14. The coolant gas is then delivered into the cooling passage 40 at substantially the same stagnation pressure as the coolant gas delivered through the injection on slot 31 and flows rearwardly along the nozzle 10 and is exhausted through an opening 47 in the cooling jacket 20 into an exhaust passage 48 leading rearwardly through the shoulder 21.

To further reduce the temperature of the nozzle wall additional cooling may be established by the insertion of a series of elongate liquid supply lines or tubes 50 extending at spaced intervals along the contoured cooling passage 40. The supply lines 50 are positioned in the passage so as to extend from their point of connection to a liquid supply manifold 51 inwardly and forwardly along the passage 40 into the throat region where the tubes are bent outwardly and embedded in the inner wall of the cooling jacket 20 so as not to restrict the flow of the gas stream through the cooling passage in the throat region. Spray orifices 52 are provided at spaced intervals along the tube facing the cooling passage 40 for spraying liquid into the gas stream. The spray orifices 52 are preferably disposed to direct the liquid spray downstream in the direction of flow of the cooling liquid gas. At the opposite end of each tube 50 the liquid supply system including the manifold 51 is provided to supply liquid in pressurized form through the liquid supply tubes into the orifices 52.

The liquid selected should have a vaporization point below the stagnation temperature of the coolant gas stream flowing through the cooling passage 40. In this way the spray tends to absorb the heat from the coolant stream so as to reduce the temperature of the nozzle wall. With the use of helium or air as the coolant stream a water spray has been found to operate advantageously to rapidly absorb the heat from the coolant stream. To establish a finely divided spray of water into the coolant stream the water is forced through the spray orifices at a pressure exceeding that of the coolant stream the mist formed will thoroughly intermix with the coolant stream to provide optimum cooling due to the heat of vaporization of the water.

In a typical test operation wherein an air stream is to be accelerated up to hypersonic speeds the helium gas is simultaneously delivered through the injection slot 31 and through the cooling passage 40 so as to form an insulated cooling layer along the inner surface of the nozzle and a pressure equalizing layer along the outer surface of the nozzle. As described, the stream may be controlled to accelerate through equivalent velocity and pressure levels in order to maintain a smooth uniform layer so that the temperature in the nozzle wall will be governed by the stagnation temperature of the coolant stream. In addition, where it is necessary to additionally cool the nozzle wall on account of the high stagnation temperatures of the coolant streams, water spray cooling is incorporated by spraying finely divided droplets of water into the outer coolant stream along the throat region whereby the heat of vaporization of the water will operate to absorb heat from the outer coolant stream so as to reduce the temperature level of the nozzle wall. Of course, it is important only that a sufficient amount of water be sprayed into the passage which will be in excess of the amount evaporated. This is determined by considering the heat transfer across the wall for given wall thickness together with the amount of heat required to be absorbed in order to reduce the temperature of the nozzle wall to the desired level.

Thus, utilizing a single nozzle construction and cooling jacket construction with a common supply chamber for the delivery of coolant gas along the inner surface and outer surface of the nozzle wall the cooling methods employed can be modified in accordance with the variations of temperatures and pressures of the main high energy stream passing through the throat region. The insulative cooling method can be employed alone or in combination with an outer stream to equalize the pressure across the nozzle wall, or both can be used in combination with the liquid spray where it is necessary to reduce the temperature of the nozzle wall below that of the coolant streams. In this respect, the construction of the cooling jacket and nozzle can be modified to provide only for the use of the insulated cooling method alone where lower temperatures and pressures only will be present.

While we have described the preferred forms of our invention, it is to be understood that additional modifications may be devised utilizing the principles of cooling as set forth. Consequently, we wish to be limited not by the foregoing description which was given solely for purposes of illustration but only by the scope of the appended claims.

We claim:

1. The method of cooling the wall of a conduit through which a main high energy gaseous stream is accelerated, comprising the step of introducing in a common direction with said high energy main stream a lower energy gaseous coolant stream of a different gas than said main stream, along the wall surface exposed to said high energy stream at a pressure and thickness sufficient to establish smooth, uniform flow between said streams, said gaseous coolant stream having differing density characteristics and having a sonic velocity greater than said main stream so as to provide a reduced stagnation temperature adjacent to the conduit wall.

2. The method of cooling the wall of a conduit through which a high energy gaseous main stream is accelerated, comprising the step of introducing a lower energy gaseous coolant stream between said high energy stream and said wall at a velocity and pressure corresponding to the velocity and pressure of said high energy stream and in a direction parallel to said high energy stream flow, said gaseous coolant stream layer comprising a different gas than said main stream and one having lower density characteristic and a sonic velocity greater than said high energy stream sonic velocity so as to establish a reduced stagnation temperature adjacent the conduit wall.

3. The method of cooling the wall of a nozzle through which a high temperature, high velocity air stream is accelerated from subsonic speeds through the hypersonic speed range, comprising the steps of introducing helium as a coolant gas stream into said nozzle at a stagnation pressure corresponding to that of said high energy stream, and directing a predetermined mass flow of said coolant gas tangentially along said inner wall surface of said nozzle to establish a smooth, uniform coolant gas layer adjacent said inner wall surface, said coolant stream having a sonic velocity greater than that of said high energy stream so as to provide for a correspondingly lower stagnation temperature in the coolant stream passing adjacent the nozzle wall.

4. The method of cooling the wall of a convergent-divergent nozzle through which a high temperature, high velocity air stream is accelerated from subsonic speeds through the hypersonic speed range, comprising the steps of introducing helium gas into said nozzle at a predetermined pressure, and passing a predetermined quantity of said helium gas between said air stream and the wall of the nozzle at a velocity and pressure corresponding to the velocity and pressure of said air stream and in such a way as to prevent intermixture between said helium gas and said air stream, said helium gas having a sonic velocity greater than that of the air stream so as to provide for a correspondingly lower stagnation temperature in the helium gas passing adjacent the nozzle wall.

5. In a flow conduit exposed to a high energy gas stream flowing therethrough, a cooling apparatus associated with said conduit comprising a coolant gas supply source, an outer wall enclosing said conduit having gas supply means for the delivery of said coolant gas into said conduit at a stagnation pressure equivalent to the stagnation pressure of said high energy gas stream flowing through said conduit, said coolant gas being directed along the inner wall surface of said conduit in the same direction as said high energy stream flow, and said coolant gas being of lower density and therefore lower energy than the high energy gas stream having the property of flowing at substantially the same velocity as said high energy stream under equivalent pressure conditions and with a stagnation temperature substantially less than the temperature of said high energy stream so as to insulate said conduit wall surface from said high energy gas stream.

6. In a flow nozzle exposed to a high energy gas stream flowing therethrough, wherein said nozzle is provided with a subsonic entrance, a transonic throat section and a divergent outlet section, a cooling apparatus associated with said nozzle comprising a coolant gas supply source, an outer wall enclosing said nozzle having gas supply means including a slot portion communicating with said subsonic entrance and means for the delivery of said coolant gas through said slot at a stagnation pressure equivalent to the stagnation pressure of said high energy gas stream flowing through said nozzle, said slot being proportioned to direct a predetermined quantity of helium as coolant gas along the inner wall surface of said nozzle in the same direction as the high energy stream flow, and said coolant gas having the property of flowing at substantially the same velocity as said high energy stream under equivalent pressure conditions with a stagnation temperature substantially less than the temperature of said high energy stream so as to insulate said nozzle wall surface from said high energy gas stream flowing therethrough.

7. In a flow conduit exposed to a high temperature gas stream flowing therethrough, a cooling apparatus for said nozzle comprising a coolant gas supply source, an outer wall enclosing said nozzle having a gas supply conduit including a slot portion communicating with the entrance of said conduit and means for the delivery of said coolant gas through said slot at a stagnation pressure equivalent to the stagnation pressure of said main gas stream flowing through said entrance, said slot being proportioned to direct a predetermined quantity of coolant gas along the inner wall surface of said nozzle in the same direction as the high temperature stream flow, and said coolant gas being of lower density and therefore lower energy than the high energy gas stream having the property of flowing at substantially the same velocity as said high temperature stream under equivalent pressure conditions and with a stagnation temperature substantially less than the temperature of said high temperature stream so as to insulate the conduit wall surface from said high temperature gas stream flowing therethrough.

8. In a flow conduit having a subsonic entrance section, a transonic throat section and a hypersonic test section for the acceleration of a high energy gas stream therethrough to hypersonic speeds, the combination therewith of a cooling apparatus comprising a jacket encircling said nozzle including means to dispose the inner surface of said outer wall in predetermined, spaced relation about the outer surface of said nozzle so as to define a contoured passageway therebetween conforming to the contour of said nozzle at corresponding points along said nozzle wall, a coolant gas supply source, coolant gas supply means communicating with said contoured passageway and said subsonic entrance for the delivery of said coolant gas through said contoured passageway and along the inner wall surface of said nozzle at a pressure corresponding to the pressure of said high energy gas stream flowing adjacent said passageway and said slot respectively, a liquid supply source to provide a liquid having a temperature of vaporization below the stagnation temperature of said coolant gas flowing through said passageway, liquid conducting means communicating with said contoured passageway for spraying said liquid into said coolant gas stream to provide for the absorption of heat from said coolant gas, said coolant gas being of lower density and therefore lower energy than the high energy gas stream flowing through said nozzle and said passageway having the property of flowing at substantially the same velocity as said high energy stream and with a stagnation temperature less than the stagnation temperature of said high energy stream so as to insulate and equalize the pressure in said nozzle wall.

9. In a thin-walled nozzle for the acceleration of a high temperature gas stream therethrough, the combination therewith of a cooling apparatus comprising an outer jacket encircling said nozzle including means to dispose the inner surface of said outer jacket in predetermined, spaced relation about the outer surface of said nozzle so as to define a contoured passageway therebetween conforming to the contour of said nozzle at corresponding points along said nozzle wall, a coolant gas supply source, a coolant gas supply conduit communicating with said contoured passageway including a slot portion communicating with the nozzle entrance and means connected to said gas supply source for the delivery of said coolant gas through said contoured passageway and said slot at a velocity and pressure corresponding to the velocity and pressure of said high temperature gas stream flowing adjacent said passageway and said slot respectively, said slot being proportioned to direct said coolant gas tangentially along the inner wall surface of said nozzle in the direction of said high temperature stream flow, a liquid supply source to provide a liquid having a temperature of vaporization below the temperature of said coolant gas, liquid conducting means communicating with said contoured passageway for spraying said liquid into said coolant gas, said coolant gas being of lower density and therefore lower energy than the high energy gas stream having the property of flowing at substantially the same velocity as said main stream with a stagnation temperature less than the stagnation temperature of said main stream so as to cooperate with said liquid to maintain a reduced temperature in said nozzle wall.

10. In an axially symmetrical, thin-walled nozzle having a subsonic entrance section, a transonic throat section and a hypersonic test section for the acceleration of a high temperature air stream therethrough from subsonic to hypersonic speeds, the combination therewith of a cooling apparatus comprising an outer jacket encircling said nozzle including means to dispose the inner surface of said outer jacket in predetermined, spaced relation about the outer surface of said nozzle so as to define a contoured passageway between said jacket and said nozzle conforming to the contour of said nozzle at corresponding points opposite said passageway, a helium coolant supply source, a helium coolant supply conduit communicating with the forward end of said contoured passageway and including a slot portion communicating with said subsonic entrance section and means connected to said supply source for the delivery of said coolant through said contoured passageway and said slot at a velocity and pressure corresponding to the velocity and pressure of said air stream flowing adjacent said passageway and said slot respectively to equalize the pressure on said nozzle wall, said slot being proportioned to direct a predetermined mass flow of said coolant tangentially along the inner wall surface of said nozzle in the direction of said main stream flow so as to provide for a smooth, uniform flow of helium along said nozzle wall, a water supply source and liquid conducting means communicating with said contoured passageway for spraying liquid into said helium coolant stream for the evaporative cooling of said coolant adjacent said nozzle wall.

References Cited in the file of this patent

UNITED STATES PATENTS

| | | |
|---|---|---|
| 2,625,008 | Crook | Jan. 13, 1953 |
| 2,651,172 | Kennedy | Sept. 8, 1953 |
| 2,770,097 | Walker | Nov. 13, 1956 |
| 2,770,944 | Jordan | Nov. 20, 1956 |
| 2,862,099 | Gage | Nov. 25, 1958 |
| 2,892,308 | Ferri et al. | June 30, 1959 |

FOREIGN PATENTS

| | | |
|---|---|---|
| 1,117,244 | France | Feb. 20, 1956 |